United States Patent
Bushnaq et al.

(10) Patent No.: US 8,255,520 B2
(45) Date of Patent: *Aug. 28, 2012

(54) CONDITION DEPENDENT DATA PROCESSING DEVICE

(75) Inventors: Abdalla Bushnaq, Dusseldorf (DE); Alexei Skvirski, Dusseldorf (DE); Frank Rueskens, Dusseldorf (DE)

(73) Assignee: Ricoh Company, Ltd., Tokyo (JP)

( * ) Notice: Subject to any disclaimer, the term of this patent is extended or adjusted under 35 U.S.C. 154(b) by 694 days.

This patent is subject to a terminal disclaimer.

(21) Appl. No.: 12/252,655

(22) Filed: Oct. 16, 2008

(65) Prior Publication Data

US 2009/0100026 A1    Apr. 16, 2009

(30) Foreign Application Priority Data

Oct. 16, 2007 (EP) ..................................... 07118581
Dec. 21, 2007 (EP) ..................................... 07150315

(51) Int. Cl.
G06F 15/173 (2006.01)

(52) U.S. Cl. ........ 709/224; 709/218; 709/219; 709/223; 709/250; 709/217

(58) Field of Classification Search .................. 709/238, 709/217, 218, 223, 224, 250
See application file for complete search history.

(56) References Cited

U.S. PATENT DOCUMENTS

| | | | | |
|---|---|---|---|---|
| 7,146,413 B2 * | 12/2006 | Spitzer et al. | ................. | 709/220 |
| 7,352,485 B2 * | 4/2008 | Kinoshita | .................... | 358/1.15 |
| 7,467,198 B2 * | 12/2008 | Goodman et al. | ............ | 709/223 |
| 7,668,565 B2 * | 2/2010 | Ylanen et al. | ............. | 455/553.1 |
| 7,958,081 B2 * | 6/2011 | Fitzpatrick et al. | ................... | 1/1 |
| 8,010,660 B2 * | 8/2011 | Bushnaq et al. | ............. | 709/224 |
| 2004/0122863 A1 * | 6/2004 | Sidman | ...................... | 707/104.1 |
| 2005/0128517 A1 * | 6/2005 | Sakamoto | .................... | 358/1.15 |
| 2007/0230463 A1 * | 10/2007 | Shima et al. | .................. | 370/389 |

OTHER PUBLICATIONS

U.S. Appl. No. 12/252,773, filed Oct. 16, 2008, Bushnaq, et al.
U.S. Appl. No. 12/252,746, filed Oct. 16, 2008, Bushnaq, et al.

* cited by examiner

*Primary Examiner* — Carl Colin
*Assistant Examiner* — Mohammad Siddiqi
(74) *Attorney, Agent, or Firm* — Oblon, Spivak, McClelland, Maier & Neustadt, L.L.P.

(57) ABSTRACT

The present invention is directed to a server system for supplying differing amounts of data into a database, wherein the system comprises the database and a data tracker device, wherein the data tracker receives data sent by a plurality of functional entities, preferably office machines and in particular devices with a printer, wherein the data tracker device is prepared to transmit data asynchronously to an intermediate buffer storage device with a queue structure, the intermediate buffer storage device storing the data sequentially and transmitting the data sequentially to the database to be stored.

14 Claims, 3 Drawing Sheets

CONDITION DEPENDENT DATA PROCESSING DEVICE

TECHNICAL FIELD

The present invention relates to a maintenance system for a plurality of functional entities and in particular to a local server system according to claim 1, a system for a map-based communication according to claim 8, a condition-dependent data processing device according to claim 11 and a method for searching at least one or a plurality of functional entities according to claim 17.

BACKGROUND ART

In the prior art it is usual to use a maintenance system for several hundred up to two thousand functional entities to control the status of the different functional entities, to provide reports about the function and other kinds of statuses including error messages, number of prints messages, accountable message and the like.

In office systems, a plurality of office machines can be spread in a building or can also be spread all over a whole country and it is usually a problem to provide the maintenance and the supplies for a big number of office machines, like printers, multifunction printers, copiers and the like.

The present disclosure is particularly directed to the maintenance of office machines or function units including a printer. The functional unit can be accessed by the maintenance system regularly or the functional unit can access to the maintenance system in case of a malfunction or another error.

The company or a customer which uses several hundreds or thousands of office machines wishes to know about the function of each of the different office machines, whether an office machine has a malfunction, whether an office machine needs supplies for the further function, for instance toner or ink or paper or the like. In such a case the different office machines are communicating with the system and the maintenance system can regularly request the different office machines to transmit their current status to the system or in case of a malfunction, the particular office machine can send a request to the system or the server of the system to initiate a communication to report the current status including the information about the error which occurred in the particular office machine.

It is particularly time consuming and processing time consuming to communicate with a big number of office machines and to manage the data achieved through the communication.

In the prior art it is usual to receive the data from the different office machines without checking whether the data is relevant or not. The data is written in a database and the data is then transmitted to the maintenance provider who processes the data for statistical purposes, maintenance purposes and accounting purposes.

However, most of the data will be repeated since not only malfunction status data or run out data are stored and transmitted, but also data concerning proper functions and proper conditions are transmitted, stored, and will have to be processed to find out the relevant data. The very big amount of data to be exchanged and transmitted in this connection limits the capacity of such systems to about two thousand office machines, like printers or multifunctional printers, including copiers, facsimile devices and the like.

To be able to communicate with more than two thousand office machines would need several servers and their inter-server communication generates another problem. The management of the server operation would slow down system and in case more and more servers would be necessary to operate a more complicated system of a big number of office machines for instance about 15000 office machines, the processor operation time and the capacity of the processors would again be the bottleneck for the whole system since the processors would have always to import and export the data to be processed, which in existing maintenance systems needs a lot of time also because the data have to be imported from the database which needs a lot of time.

Corresponding problems could occur on other technical fields. For instance, it could be that a mobile phone network provider wishes to provide additional maintenance features. In case the accumulator of a mobile phone undergoes a certain power level, this kind of functional entity could communicate corresponding information to the maintenance system for statistical purposes, alert signal purposes or the like.

The same can be interesting on the future field of electronic households, cars with a self-diagnosis of fault communication system, were malfunctions or shortage conditions, for instance a motor or gear oil shortage condition in a motor vehicle can occur, or on other fields, were corresponding functional entities may have to be provided with services like maintenance services, alert signal services, spare part order services, account services and the like.

DISCLOSURE OF THE INVENTION

Accordingly, it is the object of the present invention to allow for some improvements each overcoming at least one of the problems of the prior art maintenance systems.

According to a first aspect of the invention, a local server system for supplying differing amounts of data into a database comprises the database and a data tracker device. The data tracker device receives data sent by a multiplicity of functional entities, preferably office machines and in particular devices with a printer, wherein the data tracker device is prepared to transmit data asynchronously to an intermediate buffer storage device with a queue structure, wherein the intermediate buffer storage device storing the data sequentially and transmitting the data sequentially to the database to be stored.

This system allows a very efficient communication with a big number of functional entities since the data tracker can have very quick communication with the different functional entities and can store the data received from the functional entity in a cache memory device, for instance a RAM memory device or the like having a large capacity to be able to have a lot of different communications in parallel. The data written into the cache memory can then synchronously be written into an intermediate buffer storage having a queue structure which allows the data to be sequentially written into a database. This hardware structure allows the system of the present invention to serve a big number of functional entities like office machines in parallel virtually at the same time and to write the data into the intermediate buffer storage device very quickly to be able to use the big data storage capacity of a database, which database on the other hand is very slow and would not be able to handle a large amount of synchronously incoming data to be stored. To summarize the concept of the invention, from the tracker to the intermediate buffer it is written synchronously, and from the intermediate buffer to the database it is written synchronously. Since the speed of the two writing processes are different the writing process from the tracker to the database is considered to be asynchronously.

Furthermore, this structure with the intermediate buffer storage device allows for a data safety buffer and another safety feature according to which in case of a malfunction of the database or in case the database is out of order, to monitor the remaining free storage space or the already occupied storage space to be able to give a warning signal in case the intermediate buffer storage device exceeds a certain threshold or falls below a certain threshold.

To decouple the writing and reading operations with respect to the database, it is advantages to have two database entities which are connected with each other again through a second intermediate buffer storage device. Accordingly, it is possible to use the first databases entity for writing data from the data tracker device through the first intermediate buffer storage device into the first database entity. The second database entity can be configured to receive either data from the first database entity or processed data from the data tracker device. The second database entity can be accessed through a reporter device which can send data to a data reporter device which can read data from a database and send the data for instance to an external device for further processing, accounting purposes or maintenance purposes.

According to another aspect of the present invention, a system for map-based communication comprises a multiplicity of functional entities in particular office machines having a printer section, and a server for monitoring a condition of each of the functional entities being connected to the server through individual connections through a network, wherein each of the functional entities is assigned to an identification. Each of the functional entities can be identified by different kinds of identification information which corresponds to a description of features and/or capabilities of each type of the functional entities. The identification information can be a serial number, a type identification number or the like. The server includes a multiple associative map structure device which provides an access information structure to access the description of features and capabilities of a functional entity which corresponds to the identification information. The term associative map described the association of data with identification. Each kind of identification information is associated with a particular associative map of the multiple associative maps stored in the multiple associative map structure devices. The server device assigns an individual recognition identification to each of said individual connections and the server is configured to form pointers with a data format consisting of the individual recognition identification of an individual connection and one of the kinds of the identification information, wherein each of the pointers allows the access to one of the particular associative maps on the basis of its particular type of identification information.

By means of the pointer technology it is possible to access information about a particular functional entity like a multifunctional printer very quickly because it is possible to avoid a sequential access like it is used in the prior art. While, according to the present invention, it is necessary to provide a number of associative maps, for instance three associative maps in case of three different types of identification information which kind of procedure is connected with the use of more memory space, however, expedites the access to the searched information to allow a very quick access to the needed information.

One possibility to enable the server to provide the map-based communication is a data tracker with cache memory structure, wherein the data tracker is connected to a database. The cache memory structure includes the multiple associative map structure and allows a quick access to the data corresponding to the features and/or capabilities of the functional entities, e.g. multifunctional printers, copiers or the like.

According to an advantageous embodiment of the invention, if an individual connection to the server is activated, at least after a functional entity connected to the individual connection has—for the first time—initiated a communication process with the server, said server assigns said individual recognition identification to this individual connection. The individual recognition identification is arranged with the identification information of the functional entity is to form the pointer. This kind of procedure allows the system to assign different identification information to the same individual recognition identification of the particular connection. In other words, in case a printer which is plugged to a connection with particular individual recognition identification will be exchanged with an other printer, the system will be flexible and will be able to assign another identification information of a functional entity or printer to the individual recognition identification assigned to a particular connection in the network.

According to another aspect of the invention, a condition-dependent data processing device is provided, which is configured to process data sent to/received from at least one of a multiplicity of functional entities, in particular office machines with a printer section. Status information are received by the condition-dependent data processing device through at least one of the following processes: Status information is send by said functional entities to said condition-dependent data processing device in adjustable regular time intervals; through a request by the condition-dependent data processing device; through a communication initiated by the respective at least one of the multiplicity of functional entities. The condition-dependent data processing device stores status information of each of the multiplicity of functional entities. The status information is assigned to a particular time. New status information received at a later time is compared with that already received. The new status information is only stored in case it differs from that received earlier. To allow a status history report about a particular office machine and also for a large number of office machines, new status information is assigned to a time when it has been received. The data processing device can be configured to be able to write new status information only into a database in case the new status information differs from the former information related to the same status. This ensures that less information and thus, less data has to be transmitted and has to be written into the database. This helps to reduce the amount of data while maintaining the information which can be achieved by processing the data. In addition, it is possible to reduce the amount of data to be transmitted in the following communication and processing operations. Also in case reports have to be prepared either for the company or for external use, the amount of data for preparing the report is reduced tremendously.

To render the system still more flexible, another embodiment according to the present invention, which may also be seen to be a separate invention, uses a storage organization in the database, according to which a limited number of columns is used, wherein a particular number of lines in said at least two columns is assigned to a functional entity to store data of a particular functional entity. The number of lines associated with the particular functional entity can be larger than necessary for the data being stored. Furthermore, the data to be stored can be cased as data of one type or value pair and wherein the storage organization in the database corresponds to this kind of data format.

This embodiment or invention allows altering or supplementing the data storage structure of the database without altering the complete structure of the database. Accordingly, it is possible to keep the memory structure of the database, on the one hand, and, on the other hand, it is possible to add information which will be of interest in the future and to obviate information which will be no longer of interest in the future but have been more of interest in the past, without restructuring the whole database.

According to another aspect of the present invention, a method for searching at least one or a plurality of functional entities based on particular identification information, said functional entities being connected with a server through a network. The identification information is configures to provide at least one capability information, condition information and condition history information and the like, of each of the functional entities, which can be represented by office machines like multifunctional printers, copiers or the like. On the basis of the identification information, attribute data is formed and the attribute data is stored in a database through the server. Queries are formed on the basis of the attributes and the server is initiated to access the database using the attribute queries to find at least one or a plurality of device being correlated to the attributes in the queries To improve the search features of the method of the present invention, operators are formed to enable the server to access to each particular of a plurality of attributes, to obviate access to each particular of a plurality of attributes and to accept each particular of a plurality of attributes. In other words, one of the operators demands for a particular attribute. The other rejects all functional entities having a particular attribute. The other operator accepts a functional entity whether it has the particular attribute or not.

The queries can be configured to combine "AND"/"OR" operation a user can create names for particular queries by his own and store the names of the queries which can humanize the query language for better use. The queries can be particularly formed to enable searches for any device attributes except for a data or a counter. The complete text search for all attributes is particularly available for all attributes which are stored in the very quick cache memory of the server.

The above explained inventions or embodiments of inventions can be combined with each other to provide an overall system for maintenance and for monitoring a big number of up to 15000 functional entities or even more. The same applies to the following specification of particular embodiments of the inventions.

It is clear that a communication in the present case means not only a communication through solid lines but also any kind of communication through RF transmission, mobile phone network transmission, light transmission channels, satellite transmission or the like, and mixtures thereof.

BRIEF DESCRIPTION OF THE DRAWINGS

In the following drawings, reference signs are assigned to the same or comparable devices so that it can be avoided to explain the same device of function twice or even more. In the following the drawings are explained as follows.

BEST MODE FOR CARRYING OUT THE INVENTION

Figure 1:
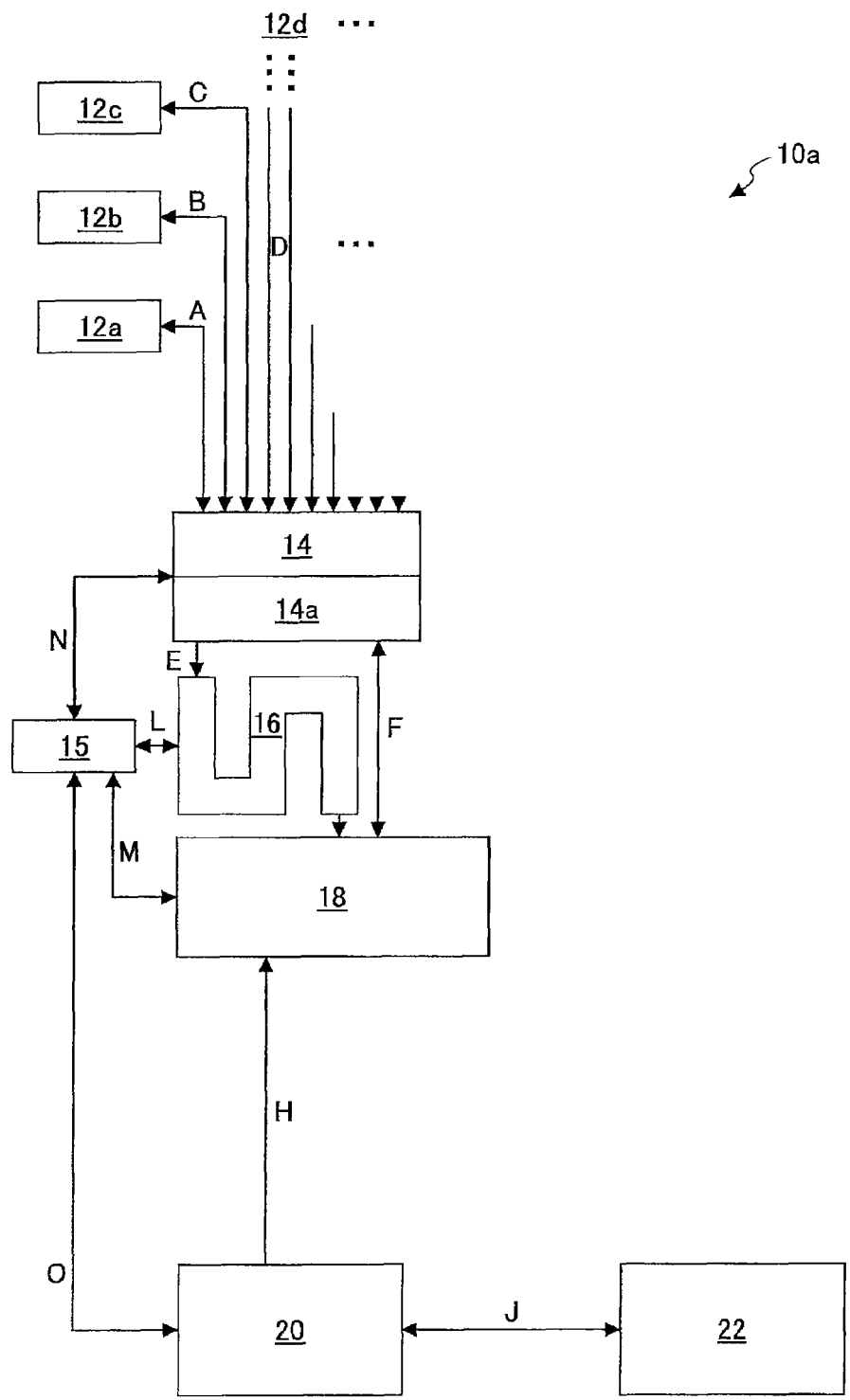
FIG. 1 is showing a functional scene of an embodiment incorporating the invention.

According to FIG. 1, a first embodiment 10a comprises a big number of functional entities 12a, 12b, 12c, 12d, ..., like multifunctional printers, copiers or the like. The functional entities will be called "printers" in the following. The printers 12a, 12b, 12c, 12d, ... are connected to a data tracker device 14 through lines A, B, C, D, ....

On the other hand, the functional entities can also be mobile phones, motor vehicles with mobile communication means household devices or the like. The lines can be solid line connections, like-less channel connections or the like and mixtures thereof.

The data tracker device 14 can consist of at least one central processing unit and a cache memory 14a having a large storage capacity of e.g. 4, 6 or 8 GB or even more. Of course, also smaller or larger cache memories can be used depending on the number of printers to be accessed.

The data tracker device 14 is connected to an intermediate buffer memory 16 which can be provided with a queue structure. Data which are received from the printers 12a, 12b, ... can asynchronously be send to the intermediate buffer storage device 16 which can store data to be sequentially written into a database 18. The buffer 16 can have a queue organization. A monitoring device 15 can be connected to the buffer 16 to monitor the filling degree of the buffer 16 through a line L in case the filling degree exceeds a particular threshold, the monitoring device 15 can issue a alarm signal through one or several of the lines M, N and O to a component of the system 10a. In addition, the monitoring device 15 can be able to send an activating signal through line M to the database 18 or can initiate that an alarm is taken to the attention of a human operator who can check the status of the database 18.

A reporter device 20 can access the database 18 to read information from the database 18 and to generate reports on the basis of the data. The reporter device is able to process the data and/or to transmit the data through a line J to an external device 22 which could be situated at a maintenance company, a sales company or the like.

The data tracker device 14 receives status data of a big number of printers 12a, 12b, ... asynchronously and can store the data in a cache memory section 14a incorporated in the data tracker device 14. In the cache memory 14a of the data tracker device 14, an actual status of each of the different printers can be stored. The data tracker device 14 compares data of a particular printer which are received at the particular time and in case the data received are differing from the data stored in the cache memory, the data associated with the particular printer are actualized. It is possible to also store the time when a condition of a printer has changed. This allows a better history report about the change of conditions of printers connected to the system of the present invention. This proceeding enables the reduction of data to be stored in the cache memory 14a and of data to be transmitted to the database 18.

The comparison which is conducted in the data tracker 14 between actual data of a printer and new data currently received can be defined as a kind of filter which has a filter characteristics related to the change between an actual condition or status of the respective printer and a new condition of the printer. Only in case a difference can be identified between the stored condition and the new condition, the new condition is written into the cache memory overwriting the former condition or status of the printer.

The communication between the printers 12a, 12b, ... and the data tracker device can be initiated through different kinds of communication. It is possible that each of the printers sends an alert signal to the data tracker device 14. The alert signal can be used to initiate a communication or the alert signal can already include condition change data indicating which section of the printer has a malfunction. Another or a further kind of communication can be on the basis of a regular request conducted by the data tracker device 14. In this case, the data tracker device sends a request for status information to each of the printers in regular time intervals of 20, 40 minutes or the like or other adjustable time intervals. The time intervals can be adjusted corresponding to the day time or corresponding to the processing capacity of the data tracker in a particular time interval, or corresponding to the printer model type.

In case a printer is connected to a line A, B or the like, the data tracker device 14 assigns individual connection recognition identification to this connection or line A, B . . . . This individual connection recognition identification is combined with identification information of the individual printer which can be a serial number, a type identification number or the like.

In the data tracker device, information regarding the features and capabilities and status of the printers can be assigned to some associative map structures, which associative map structures are provided to allow a quick access to information of a printer connected to a particular connection.

Accordingly, the data tracker device forms a kind of pointer which is able to point through the associative map structure to a memory location where information about the capabilities, the statuses and the like of a printer are stored. Accordingly, a quick access to information about a particular printer is available.

Since each type of identification information needs a specific associative map, one additional associative map per additional identification information type is necessary. So, the pointer will preferably consist of the individual recognition identification assigned to a particular individual connection and one of the acceptable types of identification information depending on the operator who adds the corresponding identification information to the system.

There are 3 kinds of associative maps needed to speed up to find the printer data:

IP address (when the status/counter is received from the devices)

Serial number (when new data is received and needs to be stored that are associated to the serial number)

Address (when printer has to be polled, this is either IP address or Hostname)

In this connection, it has to be kept in mind that the identification information is not put into the server through a terminal connected to the server but through the main system which accesses the different printers 12a, 12b, . . . to conduct printed jobs. Since such main systems can be distributed over a country or even over a continent or the whole world, it is not sure that everywhere all over the distribution area every operator adds a new office machine or printer to the main system using the same type of identification information. Therefore, it is necessary to enable the server 14 to quickly find the corresponding information about a printer 12a, 12b, . . . to monitor and serve the printer and to be able to be free for the access to another printer or to be accessed by another printer.

The asynchronous access by a big number of printers and the selection of printer condition or status information which is worth to be stored and/or processed and/or reported is a basic feature also in this connection.

In case a new connection to the server 14 is activated by plugging a printer 12a, 12b, . . . for the first time to a new connection and, for the first time a printer start communication with the server, the server assigns the individual recognition identification to this connection. In case the printer should be changed and another printer be connected to the same connection, the server will still assign the same individual recognition identification to this individual connection, however read the different identification information identifying another type or kind of printer.

To allow the reduction of data to be processed and to be communicated among the different devices shown in FIG. 1, it is necessary to keep actual status information, condition information and capability information about each of the printers connected to the server 14 in the cache memory of the server 14. In case new information is communicated from one of the printers or from several of the printers connected to the server 14, the server 14 compares the information with the actual information stored in the cache memory. In case the new information differs from the stored information, the new information is used to overwrite the old, no longer valid status, condition or capability information. It is also possible to store the time when the change occurred. On the other hand, it is also possible to store clearance information, in case a malfunction status reported at an earlier time from a printer to the server 14 has been cleared by maintenance or repairing the corresponding printer, it is also possible for a later history report to store the time when the clearance information was communicated from the printer 12a, 12b, . . . to the server 14.

Accordingly, the operation of the server in this connection can be defined as a kind of filter, wherein the difference between the formerly stored information and the new information is the filter criteria for the decision whether the new information is not worth to be stored and is not useful for overwriting the actual information.

In accordance with these features, it is possible to reduce the amount of data to be stored in the server 14 as well as the amount of data to be transmitted through the buffer memory with the queue structure to the database 18. In addition, it is of course also possible to reduce the information which has to be requested by the reporting device 20 through line H as well as the information to be communicated to the external access or server device 23, which could be located at the sales company.

To increase the flexibility of the system, it is also advantageous to provide the database 18 with the special storage organization. According to this very advantageous storage organization, the database is organized to consist of a limited number of columns, in particular two columns, wherein a particular number of lines in said at least two columns is assigned to one of the printers. The number of storage lines in the storage organization can exceed the number of data to be stored per printer. Accordingly, it is possible to add information to be stored for a printer in the database or to obviate information stored for the printer without amending the whole database storage organization.

In particular, it has proved very advantages if the data is stored as one type or a value pair and the storage organization in the database corresponds to this data format.

Another feature, which still expands for flexibility or the speed of the system is related to a method for searching at least one plurality of printers 12a, 12b, . . . based on particular identification information, wherein the printers are connected with the server 14 through the network A, B, C, D, . . . .

Information regarding each of the printers 12a, 12b, . . . is stored for instance in the cache memory of the server 14, or for the start up of the server 14 in the database 18. The identification information is configured to provide at least one of capability information, condition information and condition history information or the like, which describes the capabilities as well as the actual condition or status of each of the printers. Of course, the identification information can be amended in case the operator should become interested in other information about one or a group of printers.

The identification information of each of the printers is used to form attribute data and the attribute data is stored for instance in the server 14 or the database 18. It is also possible to store such attribute data in the reporting device 20. Then, queries are formed on the basis of the attribute data and the server is initiated to access the database using the attribute queries to find at least one or a plurality of printers being correlated with the attributes in the queries.

This feature helps to prepare reports about office machines or printers having particular attributes.

In this connection, operators are formed to enable the server to access to each particular of a plurality of attributes and, to accept each particular of plurality of attributes. In other words, the operators are used to search printers having a particular feature, status, condition or the like or the search for printers not having this particular condition, status, feature or the like. One operator can also be used in case a particular status, condition, capability, feature or the like is acceptable but not necessary.

Accordingly, the attribute information can be treated as a text file and the queries are formed to allow a full text search to identify a particular printer or particular groups of printers. In other words, an associative map of text strings is introduced where the labels (or attribute name(s)) are used to be associated to a string or strings. This helps a user to find quickly and precisely the searched devices for printers.

Figure 2:
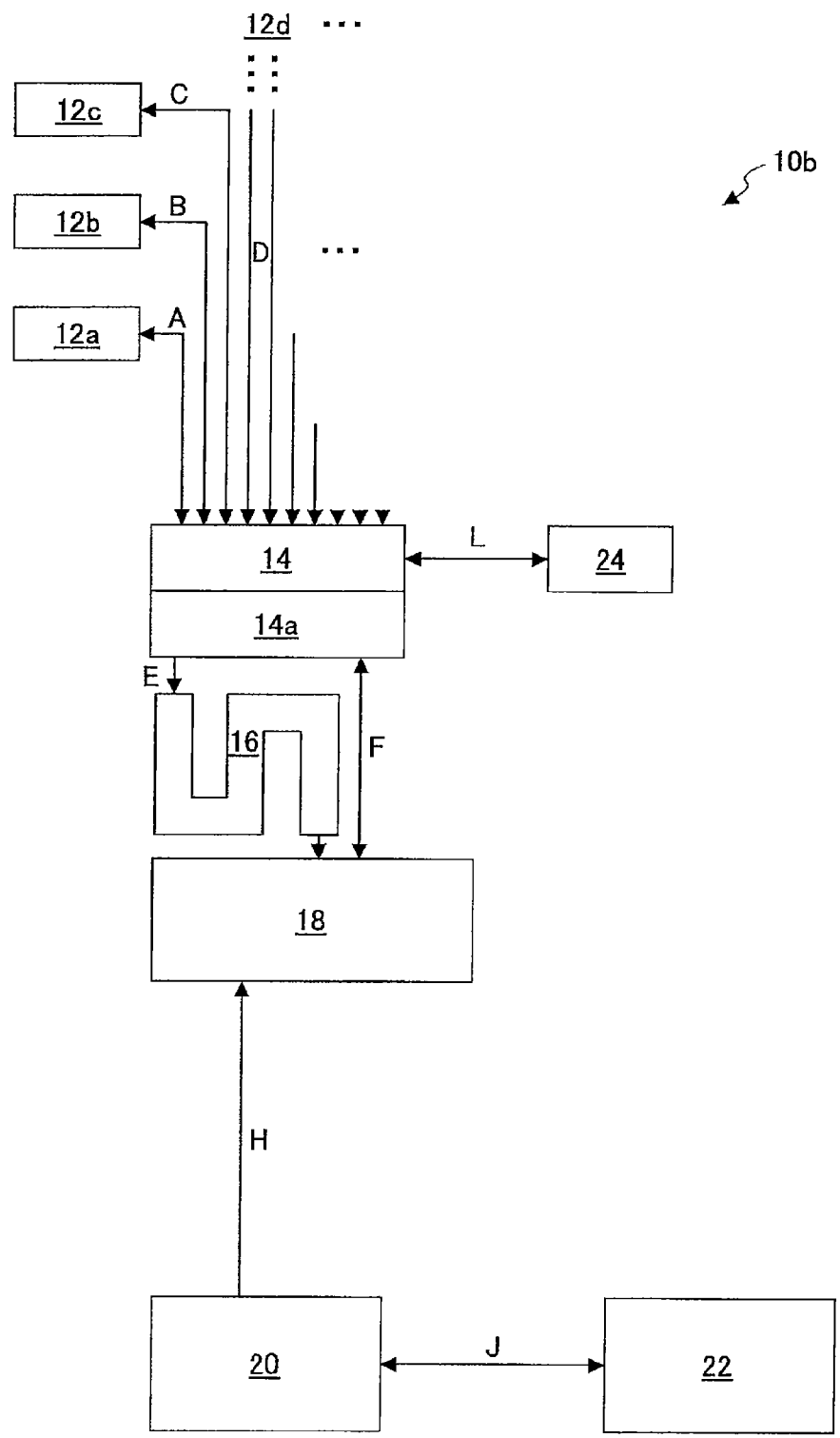
FIG. 2 is functional scene of an other embodiment including the features of the present invention or inventions.

In FIG. 2, an additional access device 24 has access to the server 14 through a data line L. According to this additional feature it is possible to have actual reports, read out from the server 14, since the server 14 always has the actual information about the current statuses of all of the connected office machines or printers 12a, 12b, . . . .

Figure 3:
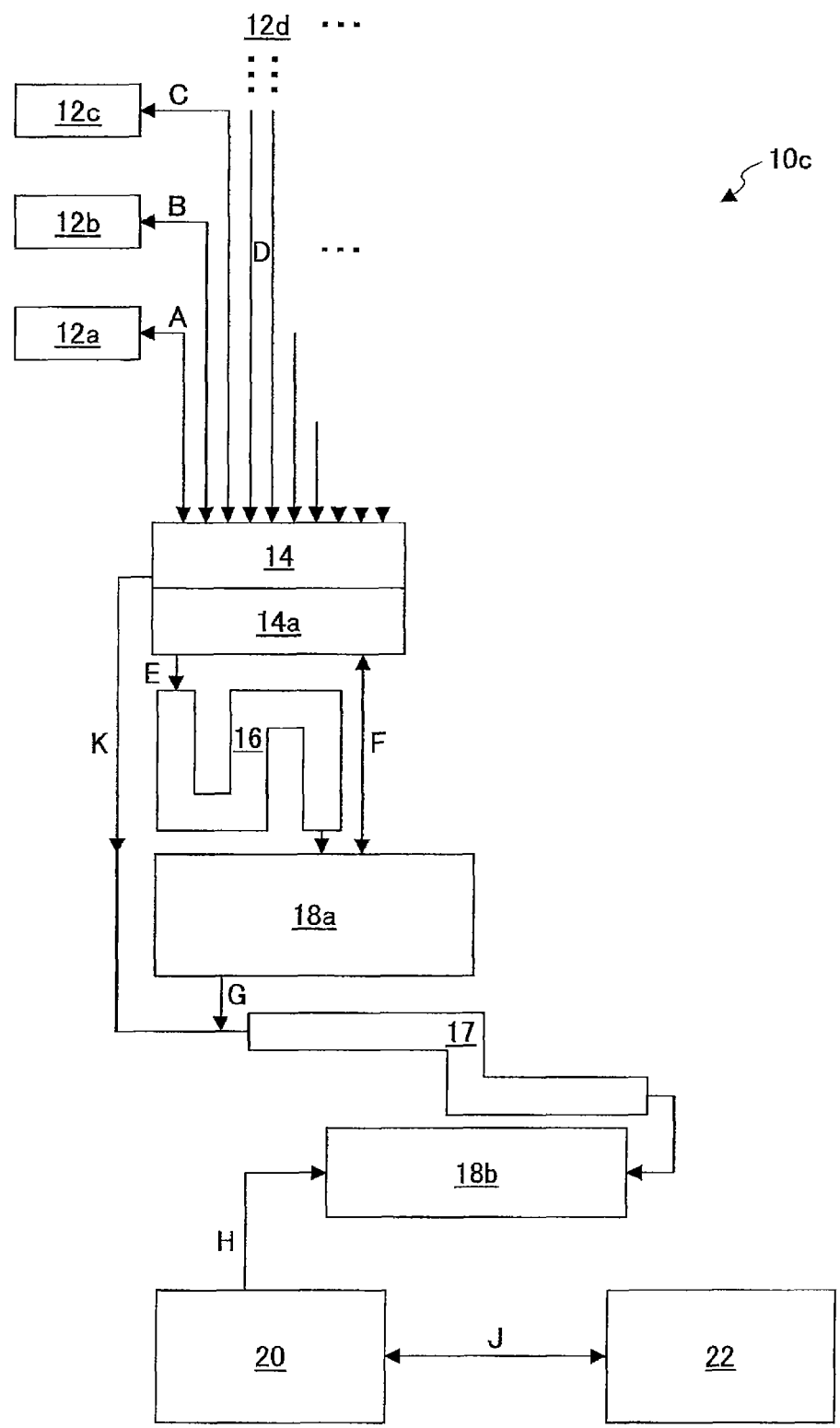
FIG. 3 is another embodiment explained with reference to a functional scene.

The other features of the embodiment 10b according to FIG. 2 can be the same as that shown and explained with reference to FIG. 1 accordingly, the embodiment of FIG. 2 can also have the alert device 15 which can also be connected to the terminal device 24 to give the alert signal to an operator to enable the operator to clear the alert situation, e.g. to activate the database 18. The embodiment 10c according to FIG. 3 shows a system configuration with two databases 18a, 18b. Since the speed of writing into a database is slow while the speed of reading data from the database is quick, it is possible that some advantages can be achieved by dividing the database 18 according to FIGS. 1 and 2 into two separate databases 18a, 18b to decouple reading and writing from and to the database, respectively.

In addition, it is possible that the server 14 can re-process data stored in the database 18a to reduce the data to be sent to the database 18b still more.

Of course, also the second database 18b can have intermediate buffer storage with the queue structure which is able to accept asynchronous writing of data and which is able to send synchronous data stream to the second database 18b.

Of course, also the embodiment 10c can be provided with one or two monitoring or alert devices 15 to monitor the filling degree of the intermediate buffer storages.

The present application is based on the European Priority Applications No. EP07118581 filed on Oct. 16, 2007 and No. EP7150315 filed on Dec. 21, 2007, the entire contents of which are hereby incorporated by reference.

The invention claimed is:

1. A local server system for supplying differing amounts of data to a database, comprising:
the database;
a data tracker device that receives data sent by a plurality of functional entities, each of the plurality of functional entities including a printer, and transmits the data sent by the plurality of functional entities, synchronously, to an intermediate buffer storage device with a queue structure, the intermediate buffer storage device storing the data sent by the plurality of functional entities sequentially and transmitting the data sent by the plurality of functional entities, synchronously, to the database to be stored; and
a storage space monitoring device that monitors at least one of a free and an occupied storage space of the intermediate buffer storage device and sends an activating signal to the database based on the monitoring.

2. The local server system according to claim 1, further comprising an alarm device that detects at least one of the free and the occupied storage space and sends a signal when the storage space exceeds or falls below a specified storage space filling degree.

3. The local server system according to one of claims 1 and 2, wherein the database includes at least two database entities,
wherein a first database entity receives the data sent by the plurality of functional entities through the intermediate buffer storage device, and
wherein the data sent by the plurality of functional entities is transmitted to a data writing engine to be reproduced and sent to a second database entity.

4. The local server system according to claim 3, wherein the data writing engine sends the data sent by the plurality of functional entities asynchronously to the second database entity, and
wherein a second intermediate buffer storage device receives the data sent by the plurality of functional entities synchronously and transmits the data sent by the plurality of functional entities as a synchronous data stream to the second database entity.

5. The local server system according to one of claims 1 and 2, wherein the data tracker device includes a cache memory that allows a quick access to information concerning the plurality of functional entities.

6. The local server system according to one of claims 1 and 2, wherein primary information in the data tracker device is retrieved from the database after a start-up procedure.

7. The local server system according to claim 1, wherein a writing speed of writing the data sent by the plurality of functional entities by the data tracker device to the intermediate buffer storage device differs from a writing speed of writing the data sent by the plurality of functional entities from the intermediate buffer storage device to the database.

8. The local server system according to claim 7, wherein transmitting the data sent by the plurality of functional entities by the data tracker device occurs asynchronously with respect to receiving the data sent by the plurality of functional entities at the database.

9. The local server system according to claim 8, wherein the data tracker device receives the data sent by the plurality of functional entities asynchronously.

10. A condition-dependent data processing method for processing data sent to/received from at least one of a plurality of functional entities, that includes a printer section, comprising:
sending status information, by each of the plurality of functional entities, to a condition-dependent data processing device in at least one of adjustable regular time intervals, upon request by the condition-dependent data processing device, and through a communication initiated by the at least one of the plurality of functional entities;

storing the status information of each of the plurality of functional entities in the condition-dependent data processing device;

assigning a specified time to the status information upon receipt at the condition-dependent data processing device;

comparing new status information received at a later time than the specified time with the status information; and storing the new status information when the new status information differs from the status information.

11. The condition-dependent data processing method of claim 10, wherein the new status information assigned with the specified time is stored in a database.

12. The condition-dependent data processing method according to claim 10, wherein storage organization in a database is organized to include a number of columns wherein a specified number of lines in at least two columns is assigned to a specified functional entity and stores data related to the specified functional entity.

13. The condition-dependent data processing method according to claim 12, wherein the specified number of lines associated with the specified functional entity is greater than a quantity of the data related to the specified functional entity, being stored.

14. The condition-dependent data processing method according to claim 12, wherein the data related to the specified functional entity is stored as one type or value pair data format, and wherein the storage organization in the database corresponds to the one type or value pair data format.

* * * * *